United States Patent Office 3,616,482
Patented Nov. 2, 1971

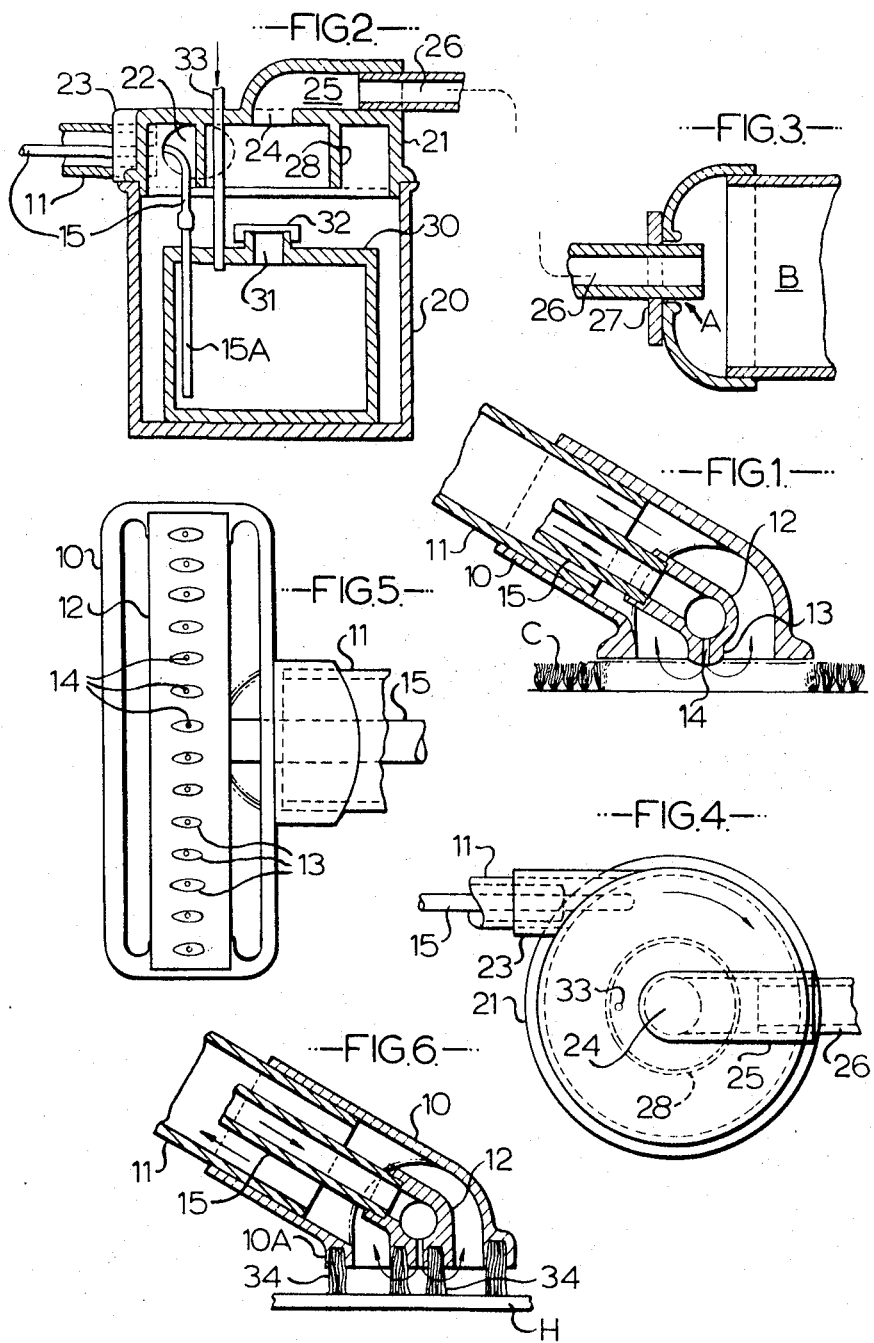

3,616,482
SUCTION OPERATED WASHING AND CLEANING APPARATUS
Wladyslaw Brycki, 19 Mayfield Road,
Liverpool 19, England
Filed Nov. 13, 1967, Ser. No. 683,097
Int. Cl. A47l 7/00
U.S. Cl. 15—321
2 Claims

ABSTRACT OF THE DISCLOSURE

The present suction cleaning device is a part of or for attachment to a source of suction such as a vacuum cleaning machine and includes a nozzle with a liquid supply and a suction tube opening in said nozzle and a container connected to said suction tube and the source suction for removing and collecting used liquid from the air passing through said container from said nozzle.

---

This invention relates to suction cleaning apparatus, and has for its object to provide an improved device or appliance for use more particularly, but not exclusively, in cleaning pile and other fabrics for example as used for floor coverings, upholstery, and the like, and which in use, is arranged to supply cleaning liquid or air to the surface to be cleaned and to remove same by suction means.

Broadly, according to the invention, a suction cleaning device or appliance comprises a cleaning nozzle, a first suction tube connected to said suction nozzle, a liquid supply tube one end whereof is connected to a spray tube and the other end whereof communicates with a liquid supply reservoir, a container connected with said first suction tube, and a second suction tube for connecting said container with a source of suction, said container being arranged so as to function in use as a separator for removing and collecting soiled liquid from the induced airstream. The source of suction conveniently may consist of a conventional or other vacuum cleaning machine.

Preferably the liquid supply reservoir is housed within the separator, and the liquid supply tube within the suction tube.

The arrangement is such that cleaning liquid is fed automatically and without valve control means to the cleaning nozzle from the supply reservoir by the sub-atmospheric pressure existing in the nozzle during use, and such liquid continuously returned to and collected by the separator.

The invention is further described with the aid of the accompanying explanatory drawings which illustrate by way of example only and not of limitation one embodiment of same.

In said drawings:

FIGS. 1 and 2 are sectional elevations depicting respectively, and more or less schematically, a suction cleaning nozzle and a separator in a device according to the invention.

FIG. 3 is a fragmentary elevation of a vacuum cleaner.

FIG. 4 is a plan view of the separator of FIG. 2.

FIG. 5 is an underneath plan view of the suction cleaning nozzle.

FIG. 6 is a sectional elevation similar to FIG. 1, but of a modified form of nozzle.

Referring to said drawings, the numeral 10 (FIGS. 1 and 5) generally denotes a cleaning nozzle which is of hollow construction, designed for detachable connection with a suction tube 11.

Said nozzle 10 is provided with an internal cross-tube 12 formed or provided on its under surface with a plurality of teeth-like projections 13 each of which is formed with a discharge aperture 14. The upper part of said cross-tube 12 has connected thereto a liquid supply tube 15 which extends within said suction tube 11. The cross-tube 12 may be adjustable and removable within the nozzle 10 in order to control the operative working depth of the teeth-like projections 13.

The numeral 20 (FIG. 2) denotes a main container or separator which is fitted with a detachable airtight cover or lid 21 having side opening 22 and a union 23 (FIG. 4) wherein the suction tube 11 is detachably connected substantially tangentially to the wall of said cover 21.

The cover 21 also is formed with a central aperture 24 and a union 25 whereto may be connected detachably a flexible suction tube 26 adapted for connection with the inlet A of a vacuum cleaning machine B. The latter may be of any type having an air inlet with which the suction tube may be associated. A satisfactory airtight connection may readily be achieved between the tube 26 and the inlet A of the vacuum cleaner B by means of a resilient flange piece or collar 27 fitted to the tube 26 as shown.

The cover 21 of the separator 20 is formed with an inner circular flange 28 concentric with the aperture 24 and extending downwardly as shown (FIGS. 2 and 4).

Removably disposed within the separator 20 is a reservoir 30 for cleaning liquid, said reservoir having a filling aperture 31 and an airtight cap 32 and being of a size such as to leave within the separator 20 room for the collection therein of soiled cleaning liquid.

The supply tube 15 of the supply apparatus 12 extends within the reservoir 30 in the form of a dip-tube 15a, and a vent pipe 33 extends from the reservoir through the cover 21 of the separator 20. Said vent pipe 33 may be of elongated flexible nature to permit of the removal of the cover 21.

It will be seen that, in use, and assuming the vacuum cleaner B is operating, a vacuous condition will be induced in the separator 20 via the suction tube 11 and therefore within the nozzle 10. When the nozzle 10 is moved over a surface to be cleaned, as for example a carpet C, the subatmospheric pressure existing within the nozzle causes liquid to be drawn in controlled manner via the supply tube 15 from the reservoir 30, such liquid being discharged from the aperture 14 of the teeth-like projections 13 of the cross-tube 12. The cleaning liquid, being in intimate and operative contact with the surface to be cleaned, functions with maximum efficiency to cleanse the surface and the solid liquid is continuously withdrawn by suction along the tube 11 into the separator 20 wherein it is effectively separated from the air stream and settles to the bottom thereof. Thus, no danger exists of liquid passing through the aperture 24 of the cover 21 and along the suction tube 26 to the vacuum cleaner.

Experiment has shown that apparatus according to the invention is efficient in use and, as the greater part of the cleaning liquid is withdrawn by the applied suction, the cleaned surface quickly dries. A further advantage resides in the fact that, due to the very short time the cleaning liquid is in contact with the fabric or surface to be cleaned, any likelihood of the colour or colours thereof being impaired is obviated, or substantially so.

Apparatus according to the invention may be employed in conjunction with most kinds of a vacuum cleaning apparatus and may readily be manufactured utilizing known materials and parts. For example the separator 20, the cover 21, and the reservoir 30 may be constructed from one of the so-called plastic substances.

The suction tube 11 may be of any convenient length and the lower part of same at least may be of rigid construction thereby to facilitate manipulation of the nozzle 10.

For window cleaning the hard surface rims of the nozzle 10 and rims of the supply tube 12. FIG. 6 may be provided with bristles or sponge. Referring to FIG. 6, this illustrates a cleaning nozzle more especially suited to the cleaning of smooth surfaces, and to this end is provided with bristles 34. Other surface cleaning elements may of course be provided.

It is to be particularly noted that, in use, the supply of cleaning liquid to the nozzle 10 by tube 12 is controlled automatically by virtue of the fact that liquid is only drawn from the reservoir 30 when the nozzle 10 is in operative contact with a surface to be cleaned and the required vacuous conditions prevail within the nozzle. Thus, the need for providing manually or otherwise operable valves, and associated moving parts, to control the liquid supply is obviated.

If desired, the reservoir 30 may be utilized float-—fashion when empty or partly empty to operate a switch or warning device adapted to indicate when the level of used liquid collected in the separator 20 is becoming too high.

What I claim is:

1. A suction cleaning device comprising a cleaning nozzle, a first suction tube attached to said nozzle, a liquid supply tube one end whereof opens into said nozzle and the other end whereof communicates with a liquid supply reservoir, a container attached with said first suction tube, a second suction tube for connecting said container with a source of suction, and said container being arranged so as to function in use as a separator for removing and collecting used liquid from air passing through said container from the cleaning nozzle, an airtight cover for said container having a tangential inlet union in the side thereof for detachable connection with said first suction tube and a central outlet union for detachable connection with the second suction tube, said liquid supply reservoir having a filling aperture, an airtight cap for said filling aperture and a vent pipe for said reservoir extending through the cover of the container.

2. A suction cleaning device as claimed in claim 1 wherein said container cover has a downwardly extending circular flange disposed concentrically about its central outlet.

References Cited

UNITED STATES PATENTS

| | | | |
|---|---|---|---|
| 930,628 | 8/1909 | Squier | 15—322 X |
| 2,233,167 | 2/1941 | Holm-Hansen | 15—353 |
| 742,880 | 11/1903 | Lotz | 15—322 |
| 2,534,808 | 12/1950 | Bevington, Jr. et al. | 15—353 X |
| 3,268,942 | 8/1966 | Rossnan | 15—346 |

FOREIGN PATENTS

| | | | |
|---|---|---|---|
| 569,799 | 2/1933 | Germany | 15—320 |
| 584,806 | 10/1959 | Canada | 15—321 |

WALTER A. SCHEEL, Primary Examiner

C. K. MOORE, Assistant Examiner

U.S. Cl. X.R.

15—322, 353